(12) United States Patent
Sugita

(10) Patent No.: US 8,734,747 B2
(45) Date of Patent: May 27, 2014

(54) METHOD AND APPARATUS FOR TREATING EXHAUST GAS

(71) Applicant: Mitsubishi Heavy Industries, Ltd., Tokyo (JP)

(72) Inventor: Satoru Sugita, New York, NY (US)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/623,323

(22) Filed: Sep. 20, 2012

(65) Prior Publication Data

US 2014/0075920 A1    Mar. 20, 2014

(51) Int. Cl.
*B01D 46/00* (2006.01)
*B01D 53/50* (2006.01)
*B01D 53/74* (2006.01)
*G05B 21/00* (2006.01)

(52) U.S. Cl.
USPC .............. 423/242.1; 423/243.01; 423/243.05; 423/244.01; 423/215.5; 422/105; 422/108; 422/111; 422/168; 422/177; 700/266; 700/273

(58) Field of Classification Search
USPC .............. 423/242.1, 243.01, 243.05, 244.01, 423/215.5; 422/168, 177, 105, 108, 111; 700/266, 273
See application file for complete search history.

(56) References Cited

U.S. PATENT DOCUMENTS

| | | | |
|---|---|---|---|
| 7,574,968 B2 * | 8/2009 | McCollor et al. | 110/345 |
| 2010/0071348 A1 | 3/2010 | Kobayashi et al. | |
| 2010/0074817 A1 * | 3/2010 | Kobayashi et al. | 423/239.1 |

FOREIGN PATENT DOCUMENTS

| | | | | |
|---|---|---|---|---|
| JP | 60-84131 | A | 5/1985 | |
| JP | 63-171622 | A | 7/1988 | |
| JP | 63-175653 | A | 7/1988 | |
| JP | 6-64715 | U | 9/1994 | |
| JP | 8-281058 | A | 10/1996 | |
| JP | 9-323024 | A | 12/1997 | |
| JP | 10-305210 | A | 11/1998 | |
| JP | 2002-204925 | A | 7/2002 | |
| JP | 3621822 | B2 | 2/2005 | |
| JP | 2008-212891 | A * | 9/2008 | B01D 53/50 |
| JP | 2011-200781 | A | 10/2011 | |
| WO | 2008/078721 | A1 | 7/2008 | |

OTHER PUBLICATIONS

Laush, "Cotinuous and Real-time Measurement of SO3 by FTIR and Quantum Cascade Laser", Industrial Monitor and Control Corporation, (14 pages).
Socha, et al., "Thermo Scientific Sulfur Trioxide CEMS Development", Thermo Fisher Scientific, (3 pages).
Breen Energy Solutions, "SO3/ Sulfur Condensables Measurement Technology", (1 pages).
Notification of Transmittal of the International Search Report and the Written Opinion of PCT/JP2013/074996, dated Nov. 5, 2013 forms PCT/ISA/210, PCT/ISA/220 and PCT/ISA/237.
Notification of Transmittal of the International Search Report and the Written Opinion of PCT/JP2013/074996, dated Nov. 5, 2013, forms PCT/ISA/210, PCT/ISA/220 and PCT/ISA/237, w/English Translation.

* cited by examiner

*Primary Examiner* — Timothy Vanoy
(74) *Attorney, Agent, or Firm* — Westerman, Hattori, Daniels & Adrian, LLP

(57) ABSTRACT

A method for treating exhaust gas is provided, which includes measuring SO3 concentration in the exhaust gas which contains at least SO2 and SO3 by using an SO3 gas analyzer; injecting fine particles into the exhaust gas after the step of measuring; cooling the exhaust gas after the step of injection, by recovering heat from the exhaust gas; collecting fly ash from the cooled exhaust gas; and removing at least SO2 from the exhaust gas after the step of collecting by absorbing the SO2 with an absorbing solution. In addition, an apparatus for treating exhaust gas is provided, which includes an SO3 gas analyzer; a fine particles injector; a heat exchanger; an electrostatic precipitator; an absorption tower; and a fine particle feed controller.

8 Claims, 2 Drawing Sheets

METHOD AND APPARATUS FOR TREATING EXHAUST GAS

BACKGROUND OF THE INVENTION

The present invention relates to a method and an apparatus for treating exhaust gas.

In general, exhaust gas exhausted from a fossil fuel fired boiler installed in a thermal power plant contains sulfur oxides, such as sulfur trioxide ($SO_3$) as well as sulfur dioxide ($SO_2$). However, if $SO_3$ contained in exhaust gas becomes fumes, the fumes of $SO_3$ may form a mist of $H_2SO_4$, which is hazardous with a strong corrosive nature. The mist of $H_2SO_4$ consists of submicron particles that substantially cannot be collected by a mere gas-liquid contact with an absorbent. Accordingly, in order to prevent the corrosion of the apparatus and to achieve cleaner exhaust gas, it is necessary to carry out processing to remove $SO_3$ from exhaust gas.

JP 63-175653 A discusses a method for controlling the amount of dust to be collected according to an estimated value of the $SO_3$ concentration contained in exhaust gas at an inlet of an electrostatic precipitator, which is calculated according to a result of measurement of the $SO_2$ concentration at an inlet of a desulfurization apparatus, so that a ratio between the $SO_3$ concentration and the dust concentration at the outlet of the electrostatic precipitator becomes a predetermined value in order to maintain a low corrosion amount in a gas to gas heater (GGH).

SUMMARY OF THE INVENTION

In the conventional method that uses an estimated value of the $SO_3$ concentration that is calculated according to the measured $SO_2$ concentration contained in exhaust gas, it is necessary to add an excessively large amount of fine particles for the sake of safety because the estimated $SO_3$ concentration does not always have an enough accuracy. Accordingly, large-size downstream facilities, such as an electrostatic precipitator or a silo, may become necessary. In addition, in the conventional method, finned tubes of GGH may be abraded due to excessively high fly ash concentration in the flue gas. The present invention is intended to provide an exhaust gas treating apparatus and an exhaust gas processing method capable of preventing the abrasion of a GGH finned tubes with minimized facilities.

According to an aspect of the present invention, a method for treating exhaust gas is provided, which includes measuring $SO_3$ concentration in the exhaust gas which contains at least $SO_2$ and $SO_3$ by using an $SO_3$ gas analyzer; injecting fine particles into the exhaust gas after the step of measuring; cooling the exhaust gas after the step of injecting, by recovering heat from the exhaust gas; collecting fly ash from the cooled exhaust gas; and removing at least $SO_2$ from the exhaust gas after the step of collecting, by absorbing the $SO_2$ with an absorbing solution, wherein the step of injecting comprises controlling an injection amount of the fine particles so that a weight ratio of a sum of flying dust concentration A and fine particles concentration P to the $SO_3$ concentration S, as shown in an expression "{(A+P)/S)}", becomes 2.0 or higher. According to a preferred embodiment of the present invention, the flying dust concentration A is calculated by using the following equation (1):

Flying dust concentration (g/Nm$^3$)=(Amount of coal fed)×(Ash concentration in the coal)×(Ash residual factor)/(Exhaust gas flow rate)      (1)

wherein the amount of coal fed is a fed amount of coal for generating the exhaust gas containing at least $SO_2$ and $SO_3$, the ash concentration in the coal is ash concentration contained in the coal, ash residual factor is a ratio of ash quantity contained in the exhaust gas before the step of injecting to ash quantity contained in the coal, and the exhaust gas flow rate is a flow rate of the exhaust gas containing at least $SO_2$ and $SO_3$ before the step of injecting. According to another preferred embodiment of the present invention, the method for treating exhaust gas is a method for treating exhaust gas fed continuously, and at least a part of the collected fly ash are used as the fine particles. According to further another preferred embodiment of the present invention, the step of measuring further includes measuring a temperature of the exhaust gas and an $SO_2$ concentration in the exhaust gas before the step of injecting. In addition, in the further another preferred embodiment of the present invention, an estimated $SO_3$ concentration is calculated based on the measured temperature and $SO_2$ concentration, a difference between the estimated $SO_3$ concentration and the measured $SO_3$ concentration by the $SO_3$ gas analyzer is calculated, and when the difference exceeds a predetermined range, a warning is issued. According to a preferred embodiment of the present invention, an apparatus for treating exhaust gas is provided, which includes an $SO_3$ gas analyzer for measuring an $SO_3$ concentration in the exhaust gas which contains at least $SO_2$ and $SO_3$; a fine particles injection grid for injecting fine particles into the exhaust gas whose $SO_3$ concentration has been measured; a heat exchanger for cooling the exhaust gas into which the fine particles have been injected, by recovering heat from the exhaust gas; an electrostatic precipitator for collecting fly ash from the cooled exhaust gas; an absorption tower for removing at least $SO_2$ from the exhaust gas from which the fly ash have been collected, through a gas-liquid contact between the exhaust gas and an absorbing solution; and a fine particle injection controller for controlling an amount of the fine particles to be injected so that a weight ratio of a sum of flying dust concentration A and fine particles concentration P to the $SO_3$ concentration S, as shown in an expression "{(A+P)/S)}", becomes 2.0 or higher.

According to a preferred embodiment of the present invention, the apparatus further includes an outlet port for taking out a portion of the exhaust gas which contains at least $SO_2$ and $SO_3$, the port being provided upstream of the fine particle feed controller for measuring the flying dust concentration. According to another preferred embodiment of the present invention, the electrostatic precipitator and the fine particle injector are connected to each other to use at least a part of the fly ash collected by the electrostatic precipitator as the fine particles. According to further another preferred embodiment of the present invention, the apparatus further includes a thermometer, which is provided upstream of the fine particle injector, for measuring a temperature of the exhaust gas before the fine particles are injected; and an $SO_2$ gas analyzer, which is provided upstream of the fine particle injector, for measuring $SO_2$ concentration in the exhaust gas before the fine particles are injected. In addition, in the further another preferred embodiment of the present invention, the fine particle feed controller is configured to calculate an estimated $SO_3$ concentration based on signals input by the thermometer and the $SO_2$ gas analyzer, configured to calculate a difference between the estimated $SO_3$ concentration and the measured $SO_3$ concentration based on a signal input by the $SO_3$ gas analyzer, and configured to issue a warning when the difference exceeds a predetermined range.

DESCRIPTION OF THE PREFERRED EMBODIMENTS

Figure 1:
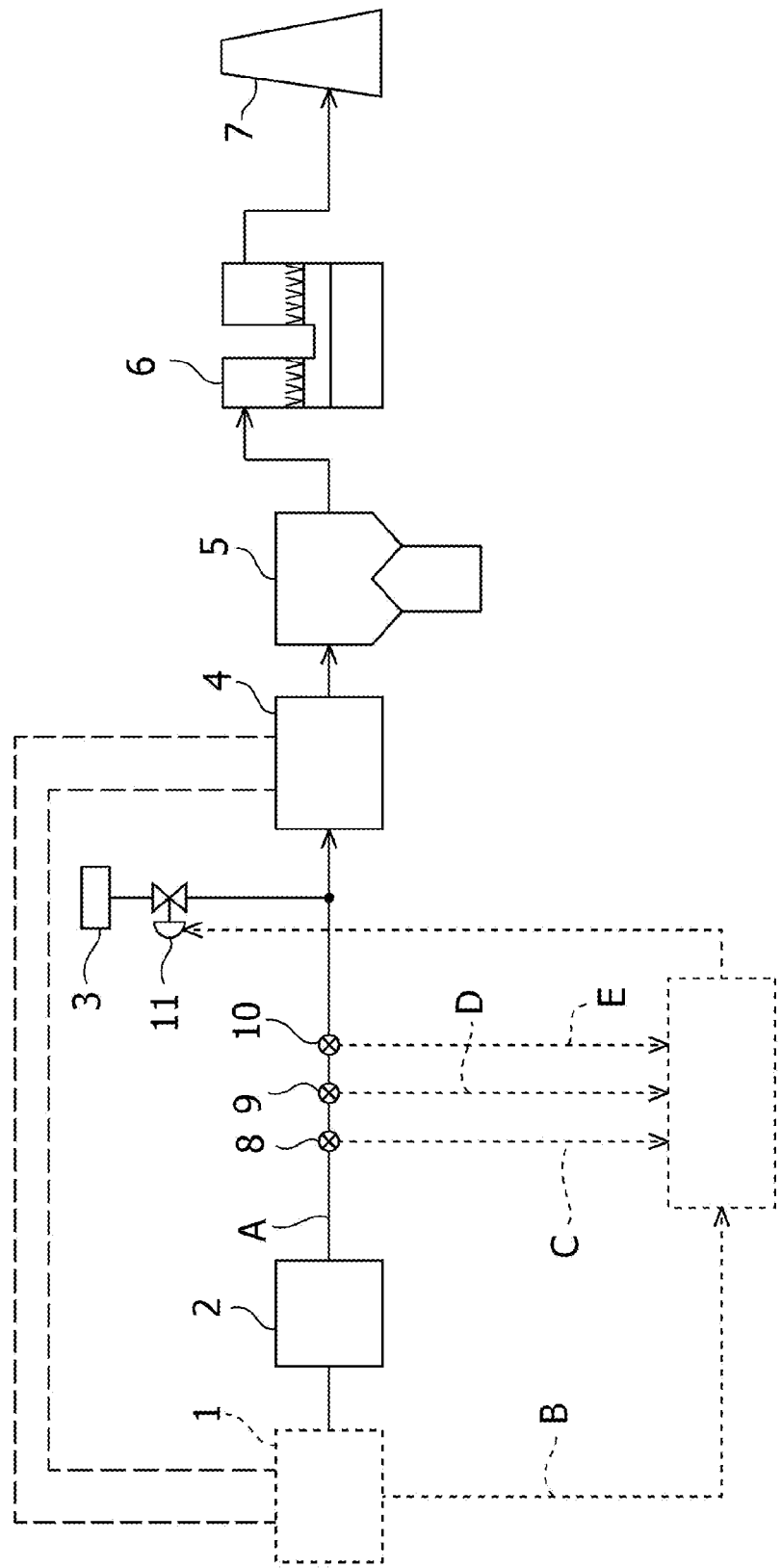
FIG. 1 is a schematic diagram which schematically illustrates an exemplary embodiment of an apparatus for treating exhaust gas according to the present invention.

FIG. 1 illustrates an example of an exhaust gas treating apparatus. In the example illustrated in FIG. 1, a boiler 1 burns a fuel, such as coal, with heat of exhaust gas. An air heater (a device equipped on the boiler 1) 2 is configured to apply heat to air for combustion, which is supplied to the boiler 1. Components including the air heater 2 and beyond are included in the exhaust gas treating apparatus and the exhaust gas treating method, which is an exemplary embodiment of the present invention, respectively. The present invention is highly useful when the present invention is used for exhaust gas from a boiler that uses various types of oil fuels, such as heavy oil, Orimulsion®, vacuum residue (VR), and coal water mixture (CWM)/heavy oil. However, the present invention is not limited to this. More specifically, the present invention can be highly useful as well when the present invention is used for exhaust gas from a coal/heavy oil mixed firing boiler. In addition, the present invention can be useful when applied in treating exhaust gas from a coal mono fuel firing boiler, which burns oil fuels at the start-up or in trial operations.

At an outlet of the air heater 2, the following components are provided. More specifically, a thermometer 8 is configured to measure the temperature of exhaust gas A. An $SO_2$ gas analyzer 9 is configured to measure the $SO_2$ concentration contained in the exhaust gas A. An $SO_3$ gas analyzer 10 is configured to measure the $SO_3$ concentration contained in the exhaust gas. The three detection devices can be provided in a freely selected order, which can be freely selected and determined. More specifically, the order of arranging the three measuring devices described above is not limited to the order illustrated in FIG. 1. A fine particle feed controller 11 has a function for adjusting the amount of fine particles injected from a fine particle injector 3 by controlling a flow rate control valve 12 or the like according to inputs of signals C, D, and E, which are received from the three measuring devices. The fine particle feed controller 11 includes a calculation unit, a driver circuit, and the like. The calculation unit includes a microcomputer, a logic sequence circuit, and the like. The driver circuit is configured to apply a drive current to a drive unit of the flow rate control valve 12, for example, according to a command input with the calculation unit.

The amount of fine particles to be injected from the fine particle injector 3 is controlled so that a weight ratio of the sum of the concentration A of flying ash and the concentration P of the fine particles to the $SO_3$ concentration S becomes 2.0 or higher.

The weight ratio described above is expressed with the following expression:

$$\{(A+P)/S\}.$$

For example, if the $SO_3$ concentration is 50 mg/m³N, the flying ash and the fine particles of 100 mg/m³N or more in total can be injected. By injecting the fine particles into the exhaust gas so that the weight ratio becomes 2.0 or higher, the abrasion of the GGH finned tubes and the occurrence of scaling, which may otherwise occur due to adhesion of the sulfuric acid mist, can be prevented with a high reliability.

The action of removing the mist by using the fine particles is a physical action of $SO_3$ condensation on the surfaces of particles included in the exhaust gas. Accordingly, the fine particles are not limited to a specific type if the fine particles can be collected by a common electrostatic precipitator or an absorption tower of a desulfurization apparatus. More specifically, it is useful to use coal ashes collected by an electrostatic precipitator of exhaust gas treating facilities installed in a coal mono fuel firing power plant as the fine particles.

The fine particles can be injected by the air conveyance or the slurry conveyance, for example. If the fine particles are sprayed as slurry, it is useful to use liquid that can be evaporated immediately when it is subjected to the heat of the exhaust gas as the constituent of the slurry, so that the action of collecting $SO_3$ on the surfaces of the fine particles can work very well. More specifically, it is useful enough to use common water, such as common industrial water, for the liquid constituting the slurry because the moisture of the sprayed slurry evaporates immediately when the slurry is sprayed into the exhaust gas due to the high temperature of the exhaust gas at the outlet of the air heater 2, which is as high as 160° C. or so. In addition, fine particles concentration in the slurry can be substantially as high as the solid concentration of the slurry, which is the absorbing solution used by a desulfurization apparatus 5. More specifically, fine particles concentration in the slurry can be 20-30% by weight. Note that according to the trial calculation carried out by the inventors et al, if the fine particles are sprayed as slurry, the heat can be recovered by the GGH without fail because the temperature of the exhaust gas may be lowered by several degrees Celsius or so only.

The $SO_3$ concentration in the exhaust gas (S) is determined according to a value measured by the $SO_3$ gas analyzer 10. By measuring the $SO_3$ concentration online as described above, the $SO_3$ concentration contained in the exhaust gas can be accurately measured. Accordingly, only a minimum amount of the fine particles to be injected becomes necessary. In addition, the size of the downstream apparatuses and facilities, such as an electrostatic precipitator or a silo, can be suppressed to a minimum and the power to be consumed can be reduced as well by preventing charging of an excessive amount of fine particles into the exhaust gas. For the $SO_3$ gas analyzer, for example, a gas analyzer constituted by a combination of Fourier-transform infrared spectroscopy (FTIR) spectrometer and a quantum cascade laser spectrometer has been marketed and can be used as the $SO_3$ gas analyzer. The marketed $SO_3$ gas analyzer can continuously measure the $SO_3$ concentration in real time.

The flying dust concentration (A) cannot be measured online because no high concentration flying dust analyzer exists on the market. However, in a coal mono fuel firing power plant, for example, the flying dust concentration is calculated with the following equation (1) according to the amount of coal fed, the ash concentration in the coal, and an actual measured value of the ash residual factor.

Flying dust concentration (g/Nm³)=Amount of coal fed)×(Ash concentration in the coal)×(Ash residual factor)/(Exhaust gas flow rate)  (1).

Each term of the equation (1) can be described in detail as follows. More specifically, the amount of coal fed is a fed amount of coal which generates the exhaust gas containing at least $SO_2$ and $SO_3$ can be generated. The ash concentration in the coal is the ash concentration contained in the coal. The ash residual factor is a ratio of ash quantity contained in the exhaust gas before the step of injection to ash quantity contained in the coal. The exhaust gas flow rate is the flow rate of the exhaust gas which at least contains $SO_2$ and $SO_3$ before the step of injection. More specifically, the exhaust gas flow rate can be calculated according to, for example, the load on the boiler. The flying dust concentration can be calculated with the calculation unit, which includes a microcomputer and which has received signals input by each of the devices that measure the amount of coal fed, the ash concentration contained in the coal, the actual measured value of the ash residual factor at the outlet of the air heater, and the flow rate of the exhaust gas. As described above, the term of the ash residual factor in the above-described equation (1) stands for the ratio of the ash quantity contained in the coal, which reaches the outlet of the air heater. More specifically, the ash residual factor can be calculated with the following equation (2). The calculation of the ash residual factor by using the equation (2) can be carried out according to the burned ash content and the amount of burned coal in an actual operation, which can be determined according to an actual measured value of the flying dust concentration at the outlet of the air heater. The flying dust concentration can be measured by using the Environmental Protection Agency (EPA) Method-5.

Ash residual factor (%)=[Actually measured value of flying dust concentration at outlet of air heater (g/Nm³)×Actually measured value of exhaust gas flow rate at outlet of air heater (Nm³/h)]/ [Amount of burned coal (g/h)×Ash quantity contained in the coal (wt. %)]×100    (2).

The ash residual factor can be calculated with the calculation unit, which includes a microcomputer and which has received an input of a signal B from the device that measures the amount of burned coal and to which the actually measured value of flying dust concentration at the outlet of the air heater, the actual measured value of the flow rate of the exhaust gas at the outlet of the air heater, and the ash concentration in the coal have been input. The ash residual factor at the outlet of the air heater may vary according to the state of the burned coal and the type of the coal used. Therefore, the ash residual factor at the outlet of the air heater does not always have a constant value acquired by one measurement operation. Accordingly, the accuracy of measuring the ash residual factor can be improved by actually measuring the flying dust concentration at the outlet of the air heater every time the type of the coal to be burned is changed. In an exemplary embodiment of the exhaust gas treating apparatus, in order to actually measure the flying dust concentration at the outlet of the air heater, an outlet port for taking out a portion of the exhaust gas which contains at least $SO_2$ and $SO_3$ before the step of injection is further provided. The outlet port can be provided at any location downstream of the air heater 2 and upstream of the fine particle feed controller 11. More specifically, the outlet port can be provided at any location between the thermometer 8 and the $SO_3$ gas analyzer 10.

If the $SO_3$ concentration contained in the exhaust gas A is measured, it is not necessary to measure the temperature of the exhaust gas A and the $SO_2$ concentration. However, as described in JP 63-175653 A, the entire contents of which are incorporated herein for reference, if the temperature of the exhaust gas A and the $SO_2$ concentration can be measured, an estimated $SO_3$ concentration can be calculated according to the temperature and the $SO_2$ concentration. More specifically, the fine particle feed controller 11 can be set so that a warning is issued if a calculated difference between the estimated $SO_3$ concentration and the measured $SO_3$ concentration, which is measured by the $SO_3$ gas analyzer, exceeds a predetermined range of 10%, for example. With the above-described configuration, the present exemplary embodiment can improve the reliability of the $SO_3$ concentration. If any anomaly occurs on the $SO_3$ gas analyzer, the estimated $SO_3$ concentration can be used instead of the measured $SO_3$ concentration. The thermometer 8 and the $SO_2$ gas analyzer 9 can be used as backup devices for the $SO_3$ gas analyzer.

A method of calculating an estimated $SO_3$ concentration disclosed in JP 63-175653 A is briefly described below. When coal is burned in a boiler, most of the sulfur content of the coal is converted to sulfur dioxide ($SO_2$), and 2 to 3% of the $SO_2$ is converted to sulfur trioxide ($SO_3$). The ratio of the $SO_3$ so converted that remains in flue gas A (i.e., residual ratio) correlates with the temperature of the flue gas A. By preparing a graph in which the temperature is plotted on the horizontal axis and the residual ratio is plotted on the vertical axis, an $SO_3$ residual ratio at a specific temperature can be obtained from the graph. Thus, an estimated $SO_3$ concentration can be determined by: (Measured $SO_2$ concentration)×(percent conversion from $SO_2$ to $SO_3$: 2 to 3%)×($SO_3$ residual ratio in flue gas at a measurement temperature).

A heat exchanger (a heat recovery unit of the GGH) 4 is provided at a location downstream of the fine particle injector 3. The heat exchanger 4 is configured to cool the exhaust gas into which the fine particles have been injected, by recovering heat from the exhaust gas. More specifically, for example, the temperature of the exhaust gas is cooled down from around 160° C. to around 100° C.

An electrostatic precipitator 5 is provided at a location downstream of the heat exchanger (the GGH heat recovery unit) 4. The electrostatic precipitator 5 is configured to collect the flying dust contained in the exhaust gas. The electrostatic precipitator 5 can collect the flying dust, such as fly ash, the fine particles injected by the fine particle injector, and the mist of sulfuric acid that has adhered to the flying dust and the fine particles. In exhaust gas treating facilities for a coal burning boiler, a so-called "high efficiency system" has been widely used. In the high efficiency system, the heat exchanger 4 is provided upstream of the electrostatic precipitator 5 and the heat recovery step is carried out before the electric collection of flying dust. The high efficiency system is intended to achieve a high efficiency of removing dust with a smaller apparatus having a simpler configuration, focusing on an action such that the per-capacity dust collection performance of an electrostatic precipitator can be improved in relation to the specific resistance of fly ash if the temperature of the exhaust gas is low.

An absorption tower 6 is provided at a location downstream of the electrostatic precipitator 5. After the flying dust is removed from the exhaust gas, the exhaust gas is introduced into the absorption tower 6. In the absorption tower 6, at least $SO_2$ and a part of the flying dust remaining in only a small amount are removed. After that, the exhaust gas emitted from a chimney 7 into the air. The absorption tower 6, for example, can have the following configuration. In the absorption tower 6, two liquid column type absorption towers (cocurrent type and counter-current type absorption towers) are installed in tandem on one tank, into which the absorbing solution is supplied. Furthermore, in the absorption tower 6, the exhaust gas is serially introduced into each of the absorption tower. In each absorption tower, the exhaust gas is subjected to a gas-liquid contact with the absorbing solution contained in the tank. Reactions that primarily occur during the processing can be expressed with the following reaction formulae (3) through (5):

(In the exhaust gas introduction portion of the absorption tower)

$$SO_2 + H_2O \rightarrow H^+ + HSO_3^- \quad (3)$$

(In the tank)

$$H^+ + HSO_3^- + 1/2 O_2 \rightarrow 2H^+ + SO_4^{2-} \quad (4)$$

$$2H^+ + SO_4^{2-} + CaCO_3 + H_2O \rightarrow CaSO_4/2H_2O + CO_2 \quad (5).$$

After the reaction occurs, in a steady state, plaster, a small amount of limestone, which is an absorbent, and a very small quantity of fly ash exist in the tank in suspension. The slurry in the tank is fed by a slurry pump into a solid-liquid separation device. The slurry is then filtered with the solid-liquid separation device and is taken out as plaster that includes little moisture. On the other hand, a part of the filtrate fed from the solid-liquid separation device can be used in circulation as moisture that constitutes the absorbent slurry.

Figure 2:
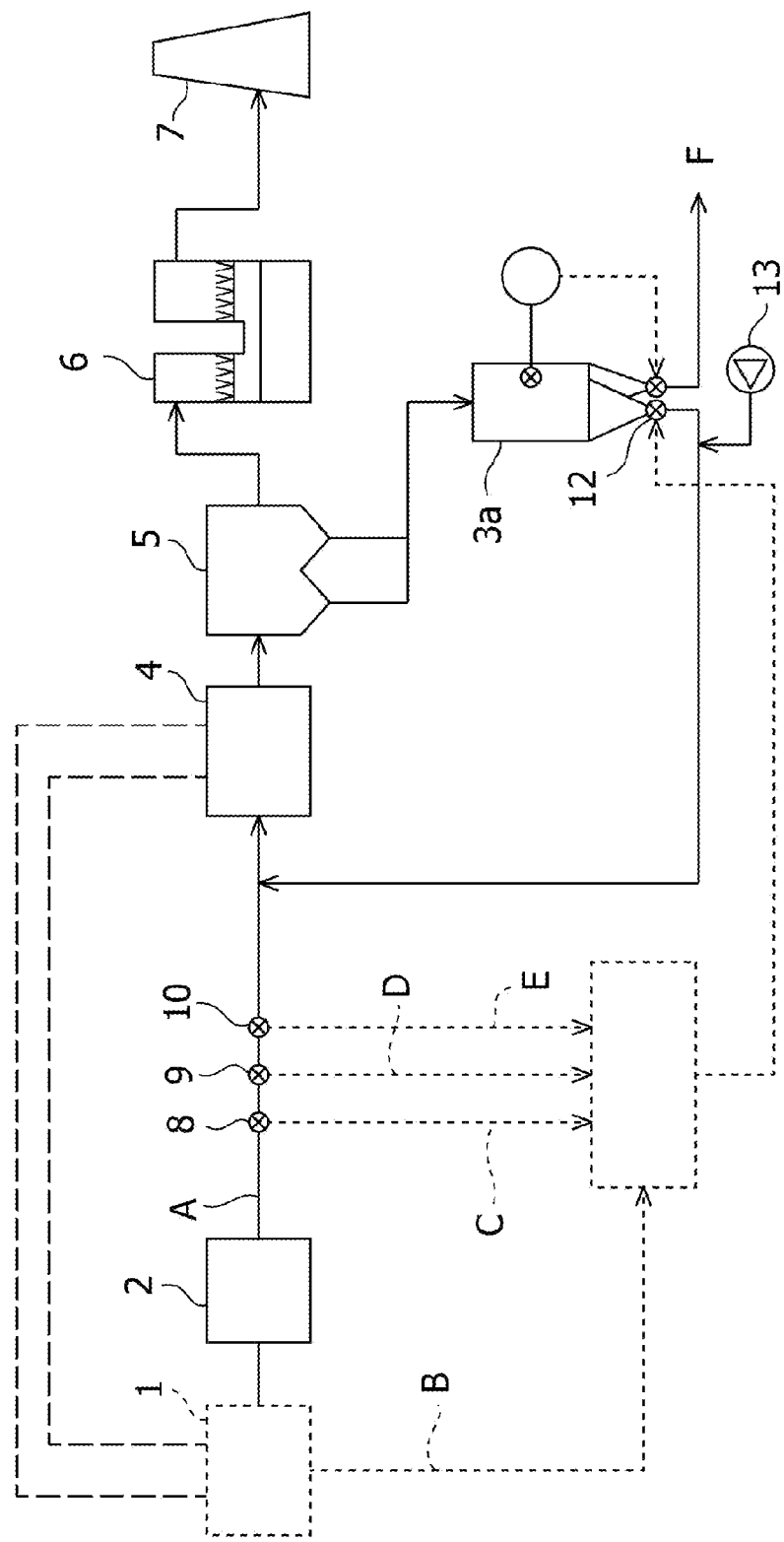
FIG. 2 is a schematic diagram which schematically illustrates another exemplary embodiment of the apparatus for treating exhaust gas according to the present invention.

FIG. 2 illustrates another exemplary embodiment of the exhaust gas treating apparatus of the present invention. In the example illustrated in FIG. 2, components similar to those of conventional apparatuses illustrated in FIG. 1 are provided with the same reference numerals and symbols. Accordingly, the detailed description thereof will not be repeated here. In FIG. 2, a silo 3a, which is the fine particle injector 3, is provided at a location downstream of the electrostatic precipitator 5. The silo 3a is configured to collect the fly ash removed from the exhaust gas. In the silo 3a, at least a part of the collected fly ash is used as the fine particles. The dust which is reused as the fine particles is the coal ashes generated by burning of the coal in a coal mono fuel firing power plant. More specifically, the exhaust gas is continuously fed and treated. At least a part of the flying dust collected by the electrostatic precipitator 5 is fed to the silo 3a first. When an input of a signal E from the SO₃ gas analyzer 10, which is configured to measure at least the SO₃ concentration, is received, the fine particle feed controller 11 adjusts the amount of fine particles to be fed from the silo 3a, which is a modification of the fine particle injector 3, by controlling the flow rate control valve 12, for example. The fine particle feed controller 11 further executes control for feeding the fine particles from the silo 3a to devices upstream of the heat exchanger 4 by using an air feeder-blower 13, for example, so that the fine particles can be used in circulation. The other portion of the fine particles that are not fed from the silo 3a to devices upstream of the heat exchanger 4 can be discharged to a discharge destination F.

Exemplary embodiments of the present invention are as described above. However, it is not intended to limit the scope of the present invention to a specific exemplary embodiment described above. In addition, it is intended that various modifications, alterations, or equivalent replacements can implement the present invention without any deviation from the spirit and the scope of the present invention as claimed in claims attached hereto.

What is claimed is:

1. A method for treating exhaust gas, comprising the steps of:
    measuring SO₃ concentration in the exhaust gas which contains at least SO₂ and SO₃ by using an SO₃ gas analyzer;
    injecting fine particles into the exhaust gas after the step of measuring;
    cooling the exhaust gas after the step of injecting, by recovering heat from the exhaust gas;
    collecting fly ash from the cooled exhaust gas; and
    removing at least SO₂ from the exhaust gas after the step of collecting, by absorbing the SO₂ with an absorbing solution,
    wherein the step of injecting comprises controlling a injection amount of the fine particles so that a weight ratio of a sum of flying dust concentration A and fine particles concentration P to the SO₃ concentration S, as shown in an expression "{(A+P)/S)}", becomes 2.0 or higher.

2. The method according to claim 1, wherein the flying dust concentration A is calculated by using the following equation (1):

Flying dust concentration $(g/Nm^3)$ = (Amount of coal fed)×(Ash concentration in the coal)×(Ash residual factor)/(Exhaust gas flow rate) (1)

wherein the amount of coal fed is a fed amount of coal for generating the exhaust gas containing at least SO₂ and SO₃, the ash concentration in the coal is ash concentration contained in the coal, ash residual factor is a ratio of ash quantity contained in the exhaust gas before the step of injecting to ash quantity contained in the coal, and the exhaust gas flow rate is a flow rate of the exhaust gas containing at least SO₂ and SO₃ before the step of injecting.

3. The method according to claim 1,
    wherein the method for treating exhaust gas is a method for treating exhaust gas fed continuously, and at least a part of the collected fly ash is used as the fine particles.

4. The method according to claim 1,
    wherein the step of measuring further comprises measuring a temperature of the exhaust gas and an SO₂ concentration in the exhaust gas before the step of injecting;
    an estimated SO₃ concentration is calculated based on the measured temperature and SO₂ concentration;
    a difference between the estimated SO₃ concentration and the measured SO₃ concentration by the SO₃ gas analyzer is calculated; and
    when the difference exceeds a predetermined range, a warning is issued.

5. An apparatus for treating exhaust gas, comprising:
    an SO₃ gas analyzer for measuring an SO₃ concentration in the exhaust gas which contains at least SO₂ and SO₃;
    a fine particles injection grid for injecting fine particles into the exhaust gas whose SO₃ concentration has been measured;
    a heat exchanger for cooling the exhaust gas into which the fine particles have been injected, by recovering heat from the exhaust gas;
    an electrostatic precipitator for collecting fly ash from the cooled exhaust gas;
    an absorption tower for removing at least SO₂ from the exhaust gas from which the fly ash have been collected, through a gas-liquid contact between the exhaust gas and an absorbing solution; and
    a fine particle injection controller for controlling an amount of the fine particles to be injected so that a weight ratio of a sum of flying dust concentration A and fine particles concentration P to the SO₃ concentration S, as shown in an expression "{(A+P)/S)}", becomes 2.0 or higher.

6. The apparatus according to claim 5, further comprising an outlet port for taking out a portion of the exhaust gas which contains at least SO₂ and SO₃, the port being provided upstream of the fine particle injection grid for measuring the flying dust concentration.

7. The apparatus according to claim 5, wherein the electrostatic precipitator and the fine particle injector are connected to each other to use at least a part of the fly ash collected by the electrostatic precipitator as the fine particles.

8. The apparatus according to claim 5, further comprising:
a thermometer, which is provided upstream of the fine particle injection grid, for measuring a temperature of the exhaust gas before the fine particles are injected; and
an $SO_2$ gas analyzer, which is provided upstream of the fine particle injection grid, for measuring $SO_2$ concentration in the exhaust gas before the fine particles are injected,
wherein the fine particle injection controller is configured to calculate an estimated $SO_3$ concentration based on signals input by the thermometer and the $SO_2$ gas analyzer, configured to calculate a difference between the estimated $SO_3$ concentration and the measured $SO_3$ concentration based on a signal input by the $SO_3$ gas analyzer, and configured to issue a warning when the difference exceeds a predetermined range.

* * * * *